Nov. 30, 1954     W. G. BEJEUHR     2,695,438
CARPET SHEARING MECHANISM
Filed May 12, 1954     2 Sheets-Sheet 1
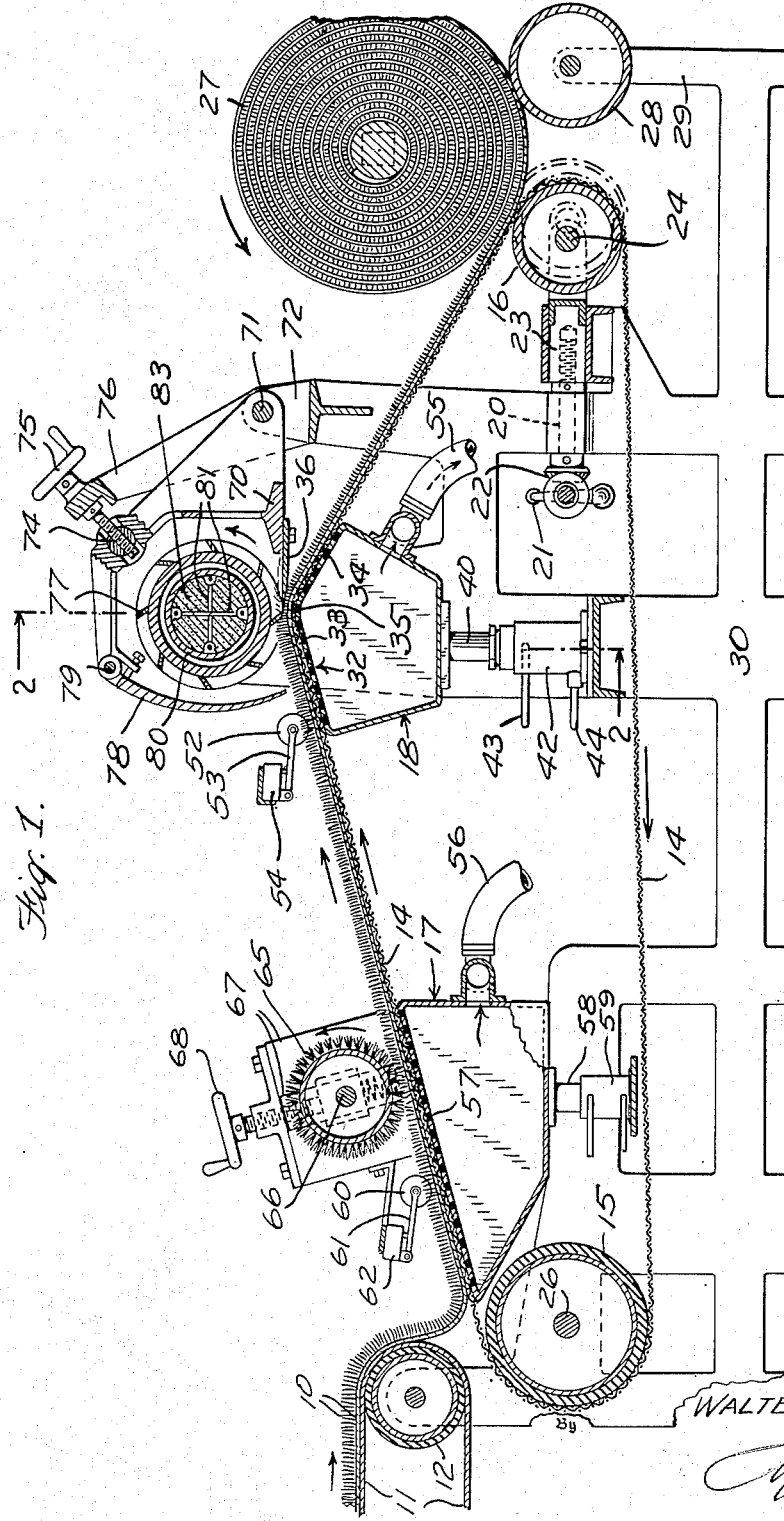
Inventor
WALTER G. BEJEUHR
Attorney Nov. 30, 1954  W. G. BEJEUHR  2,695,438
CARPET SHEARING MECHANISM
Filed May 12, 1954  2 Sheets-Sheet 2
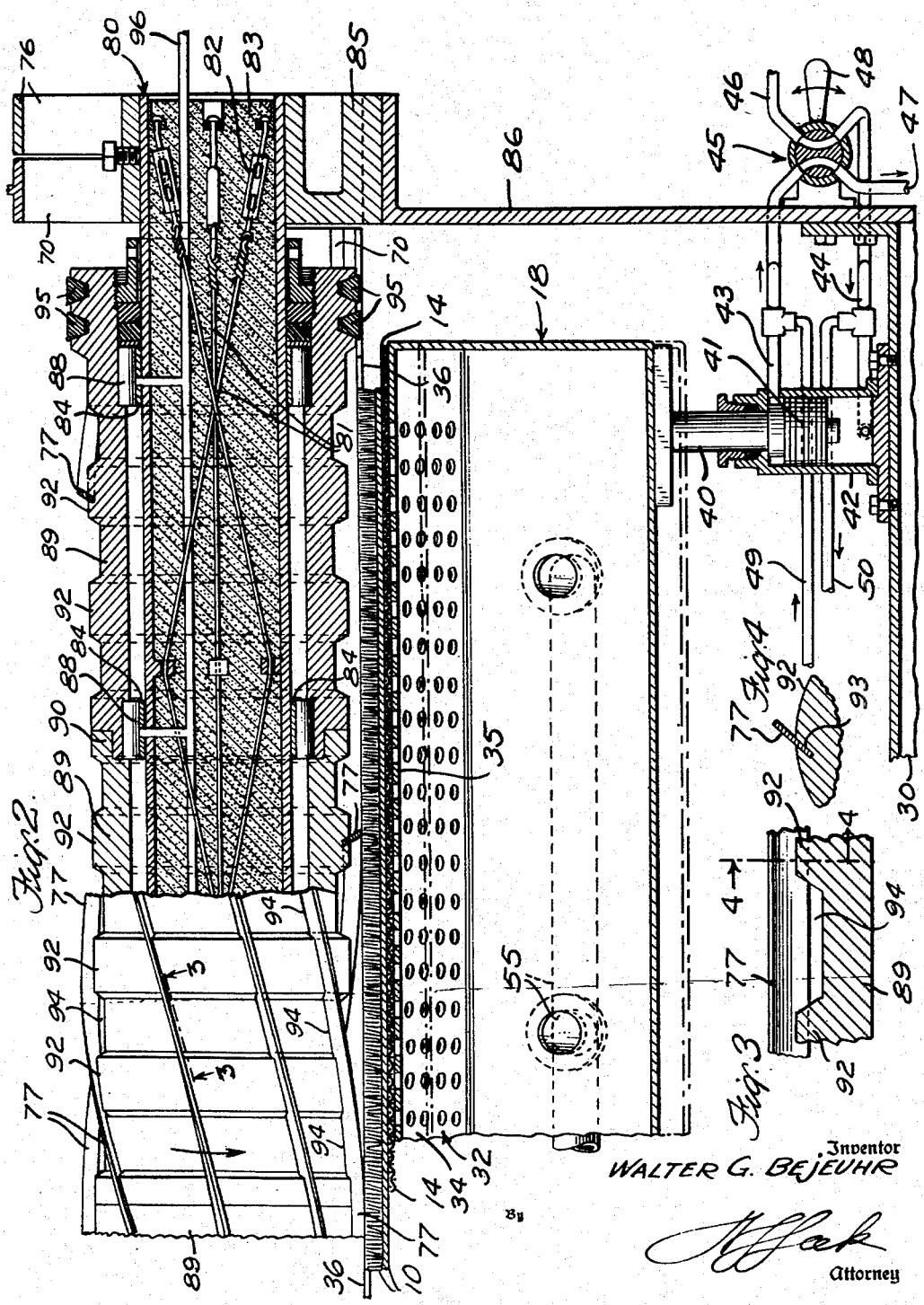
Inventor
WALTER G. BEJEUHR
By
Attorney

United States Patent Office 2,695,438
Patented Nov. 30, 1954

2,695,438

CARPET SHEARING MECHANISM

Walter G. Bejeuhr, Mount Vernon, N. Y., assignor to Alexander Smith, Incorporated, White Plains, N. Y., a corporation of New York Application May 12, 1954, Serial No. 429,197

14 Claims. (Cl. 26—17)

This invention relates to a carpet shear and has for an object to provide a carpet shearing mechanism having novel and improved details of construction and features of operation.

Another object is to provide a shearing device which is stable and free from vibration even when constructed with a long span such as that required for shearing broadloom carpet.

Another object is to provide a rotary shearing device in which vibrations are reduced or eliminated even when operating at relatively high speeds.

Another object is to increase the rate at which a broadloom carpet can be sheared.

Another object is to provide a mechanism of the above type having novel and improved means for feeding the carpet past the shearing station.

Various other objects and advantages will be apparent as the nature of the invention is more fully disclosed.

In accordance with the present invention the shearing station includes a rotor which is journaled for rotation about a fixed support. The support is made vibration resistant by using two materials having different vibration characteristics. Specifically it may comprise a steel tube with internal bracing and with a cement core. Such a structure can be made to flex only a few thousandths of an inch in long spans and will oppose, offset or prevent vibration from developing, even if the rotor becomes unbalanced through accumulation of lint or residue on its walls, or through unequal loading. In order to still further reduce vibration the rotor, which carries the shear blades, is made in short sections which are each dynamically balanced before assembly. Consequently the rotor may be operated at a high speed which increases the rate of shear of a broadloom carpet and the absence of flexing materially increases the life of the blades.

A woven wire belt is used to convey the carpet past the shearing station. Suitable suction chambers are provided beneath this belt to hold the carpet frictionally against the belt so that the carpet is fed therewith without the use of mechanical gripping devices or pins which would tend to injure the carpet.

The features of the invention will be better understood by referring to the following detailed description, taken in connection with the accompanying drawings in which a specific embodiment has been set forth for purposes of illustration.

In the drawings:

Fig. 1 is a longitudinal section through a shearing mechanism embodying the present invention and illustrating the arrangement of the conveyor belt, vacuum boxes and shearing rotor;

Fig. 2 is a section taken on the line 2—2 of Fig. 1 showing the shearing rotor partly in section and partly in elevation, and showing the hydraulic mechanism for raising and lowering the vacuum box;

Fig. 3 is a detail view taken on the line 3—3 of Fig. 2 showing the mounting of the shearing blade; and Fig. 4 is a partial section taken on the line 4—4 of Fig. 3.

Referring to the drawings more in detail the carpet 10 to be sheared is shown as being fed from a conveyor 11 passing over a guide roll 12. The carpet 10 passes from the conveyor 11 onto an endless conveyor 14 which is of open construction such as a woven wire mesh belt. The conveyor 14 passes around guide rollers 15 and 16 and over suction boxes 17 and 18. The guide roll 16 is shown as adjustable by means of a threaded shaft 20 operated by a handle 21 through two pairs of miter bevel gears 22 and controlling the position of a slide 23 in which the shaft 24 of the guide roll 16 is journaled. The guide roll 15 is mounted on a shaft 26 which may be driven by any suitable means not shown. The carpet, after shearing, is rolled into a roll 27 which rests upon the guide roll 16 and a second guide roll 28, journaled on a support 29 which forms a part of the frame 30 of the machine.

The vacuum box 18 is formed with a perforated top 32 which guides and supports the endless conveyor belt 14. The top 32 is provided with inclined portions 33 and 34 meeting at a sharp angle at a point 35 which is directly beneath a shearing knife 36. The purpose of the sharp angle is to separate the pile tufts at the shearing point. The angle is selected in accordance with the pile condensity and height so as to provide the necessary tuft support and at the same time to expose the tufts for shearing. A flatter angle provides more tuft support and vice versa.

The vacuum box 18 is shown as mounted on a piston rod 40 carrying a piston 41 operating in a hydraulic cylinder 42. Liquid flow to the top and bottom of the hydraulic cylinder 42 is controlled by pipes 43 and 44 respectively which are connected to a control valve 45. A liquid supply pipe 46 and a liquid return pipe 47 are connected to the valve 45 to supply the hydraulic liquid to the cylinder 42 under the control of the valve 45. The valve 45 is provided with passages selectively connecting the liquid supply pipe 46 and the return pipe 47 to the pipes 43 and 44, or vice versa, depending upon whether the piston 41 is to be raised or lowered.

The valve 45 is shown as actuated by a link or handle 48 which may be manually controlled or may be automatically controlled as by a solenoid control not shown. Pipes 49 and 50 connected respectively to the pipes 43 and 44 lead to a cylinder similar to cylinder 40 disposed at the other end of the device for the simultaneous raising and lowering of both ends of the vacuum box, as required.

For controlling the valve 45 a feeler roll 52 is shown as mounted ahead of the shearing station in a position to ride on the pile surface to be sheared. The roll 52 is mounted on an arm 53 and is adapted, when raised from normal position, as when passing over a lap or seam in the carpet, to close a microswitch 54. The switch 54 is connected through suitable relays to actuate the solenoid control-led valve 45 so as to momentarily lower the suction box 18 to provide clearance for the extra thickness of carpet to pass under the shearing knife. The box 18 is connected to a source of vacuum such as a blower by a duct 55.

The vacuum box 17 is connected to a duct 56 and is provided with a perforated top 57 over which the belt 14 passes, and which is adapted to apply suction to the carpet resting on the conveyor belt 14 so that it is frictionally held to the conveyor belt due to the pressure of the atmospheric air.

The vacuum box 17 is mounted on a piston rod 58 operating the cylinder 59 in a manner similar to the hydraulic control mechanism for the vacuum box 18 above described. A feeler roll 60 carried on an arm 61 is adapted to close a switch 62 in response to the passing of an extra thickness of carpet. The switch 62 is connected to control the operation of the cylinder 59 in a manner similar to that above described so as to momentarily lower the vacuum box 17 during the passage of a seam or lap in the carpet.

A rotary comb 65 is mounted on a shaft 66 carried in a bracket 67 which is adjustable by means of a hand wheel 68 and is driven by suitable means in the direction of feed of the carpet to comb the pile tufts of the carpet as they pass thereunder and remove loose fibers therefrom so as to condition the same for shearing. A carpet seam is allowed to pass under the rotary comb 65 due to the momentary lowering of the vacuum box 17 as above described.

The shearing mechanism comprises the stationary bed knife 36 mounted on a bracket 70 which is pivoted at 71 to a frame 72 which constitutes a part of the frame of the machine. The bracket 70 is adjusted in position about the pivot 71 by means of an adjusting screw 74 actuated by a hand wheel 75 which is carried in a rigid arm 76 attached to the stationary frame 72.

A rotor, carrying blades 77 cooperates with the knife 36. A hood 78, pivoted at 79 to the bracket 70, forms an enclosure for the rotor so that a strong air current may be drawn along the rotor for purpose of removing the lint.

In accordance with the present invention the rotor is mounted on a fixed metal tube 80 which is provided with internal bracing wires 81 which are placed under tension by turnbuckles 82 for holding the tube rigid. The tube 80 is then filled with cement to form a core 83. The cement filled and internally braced tube forms an extremely rigid support for the rotor, and provides a combination of two materials having different vibration characteristics, with a tendency to oppose or prevent vibrations which might be produced by the rotor.

The tube is supported at both ends in supporting plates 85 attached to brackets 86 forming a part of the rigid frame of the machine. Rings 84 of hard metal such as Stellite are shrunk onto the tube 80 at proper intervals and ground accurately in regard to diameter and concentricity to form inner raceways for bearing rollers 88. Cylindrical sections 89 supporting the blades 77 are positioned over the sets of roller bearings 88 and are formed with intermeshing flanges 90 at their abutting ends by which the cylindrical members 89 are joined into a unit. The measures 89 are provided with a series of annular projecting flanges 92 having slots 93 as shown in Fig. 4 in which the inclined helical blades 77 are secured as by swedging. The bottom edge of the blades is held spaced from the grooves 94 in cylindrical members 89 between the flanges 92 to prevent accumulation of lint and to facilitate cleaning by the air blast. The blades 77 secure the sections 89 against axial movement and consequently secure the entire rotor into a unitary structure.

In order to further eliminate causes of vibrations, the outer tube 90, to which the shear blades 77 are attached, is constructed in sections of about 27 inches in length and the sections are individually, dynamically balanced before assembly.

The rotor is driven by suitable means indicated as V-belts 95 which are preferably located at both ends so as to reduce the driving torque. A strong air current is passed axially around the rotor by a blower fan not shown so as to remove the lint and dust in a manner which is well known in the art. An oil pipe 96 embedded in the cement core 83 supplies oil to the various sets of roller bearings 88.

In the operation of this device the cutting knife 36 is adjusted to its proper operating position relative to the rotary blades 77 by means of a hand wheel 75 and the vacuum box 18 is adjusted to the proper height with respect to the knife 36 for shearing the pile to the desired length. During normal operation of the device vacuum box 18 remains stationary and a uniform shear is obtained. However, when a lap or seam is encountered the vacuum box 18 is momentarily lowered as above described to provide clearance for the passage of this increased thickness past the shearing station. The angle 35 at the top of the vacuum box is so designed as to produce the necessary break in the carpet and at the same time to obtain the desired support for the tufts while being sheared.

The extreme vibration resistance of the cement filled tube 80 permits the dynamically balanced rotor to be rotated at a relatively high rate of speed such as 1000 R. P. M. to 1500 R. P. M. without excessive vibration, and therefore increases the rate at which the carpet can be fed past the shearing station. At the same time a uniform shear is obtained since the flexing of the support is negligible even in the long spans which may be required for shearing broadloom carpet.

What is claimed is:

1. A carpet shearing device comprising a stationary bed knife, a rotor having blades cooperating with said knife for shearing, conveyor means conveying a pile carpet past said knife for shearing the pile thereof, said conveyor means comprising an endless, air-pervious belt on which said carpet rests with the pile up, and a suction chamber below said belt positioned to reduce the air pressure on the underside of said belt for thereby holding said carpet in frictional contact with said belt for feeding thereby.

2. A carpet shearing device comprising a stationary bed knife, a rotor having blades cooperating with said knife for shearing, conveyor means conveying a pile carpet past said knife for shearing the pile thereof, said conveyor means comprising an endless, air-pervious belt on which said carpet rests with the pile up, and a suction chamber below said belt and having a porous top on which said belt rides, said top having oppositely inclined portions joining at a sharp angle at the shearing station to separate the rows of tufts as they pass thereover.

3. A carpet shearing device comprising a stationary bed knife, a rotor having blades cooperating with said knife for shearing, conveyor means conveying a pile carpet past said knife for shearing the pile thereof, said conveyor means comprising an endless, air-pervious belt on which said carpet rests with the pile up, and a suction chamber below said belt and having a porous top on which said belt rides, said top having oppositely inclined portions joining at a sharp angle at the shearing station to separate the rows of tufts as they pass thereover, said suction chamber being disposed beneath said shearing and having means for adjusting the elevation thereof with respect of said knife in accordance with the desired length of pile after shearing.

4. A carpet shearing device comprising a stationary bed knife, a rotor having blades cooperating with said knife for shearing, conveyor means conveying a pile carpet past said knife for shearing the pile thereof, said conveyor means comprising an endless, air-pervious belt on which said carpet rests with the pile up, and a suction chamber below said belt and having a porous top on which said belt rides, said top having oppositely inclined portions joining at an angle at the shearing station to separate the rows of tufts as they pass thereover, said suction chamber being disposed beneath said bed knife and having means for adjusting the elevation thereof with respect of said knife in accordance with the desired length of pile after shearing, a feeler responsive to variations in carpet thickness disposed in advance of said knife, and means actuated by said feeler and in response to the passage of a carpet portion of excessive thickness to actuate said adjusting means to lower said suction chamber and the carpet thereon during the passage of said portion past said shearing station.

5. The invention set forth in claim 1 in which said air-pervious conveyor comprises a wire belt.

6. The invention as set forth in claim 3 in which the means for adjusting the vacuum chamber comprises a hydraulic cylinder and a piston sliding therein, said piston being connected to control the elevation of said chamber.

7. A carpet shearing device comprising a stationary bed knife, a rotor having blades cooperating with said knife for shearing, conveyor means conveying a pile carpet past said knife for shearing the pile thereof, said conveyor means comprising an endless, air-pervious belt on which said carpet rests with the pile up, a guide member disposed to guide said belt in an upwardly inclined direction to said knife and in a downwardly inclined direction from said knife and a suction box having a perforated top disposed beneath the upwardly inclined portion of said belt to apply suction thereto for holding said carpet in feeding engagement therewith.

8. The invention set forth in claim 7 in which said box is mounted for adjustment in height with respect to said knife for adjusting the length of the sheared pile.

9. The invention set forth in claim 1 in which said suction chamber comprises a suction box having a perforated top over which said belt rides, said box being adapted to guide said belt past the cutting knife and to apply suction thereto for holding the carpet against the belt during shearing.

10. A carpet shearing device comprising a bed knife and a conveyor means conveying a carpet past said knife for shearing, a rotor support comprising a fixed tube having a cement core, means supporting said tube at both ends, a plurality of roller bearings supported by said tube, a rotary cylinder having a plurality of sections, each section individually dynamically balanced and journaled to rotate on said bearings and cutting blades carried by said cylinder to cooperate with said knife.

11. The invention set forth in claim 10 in which internal bracing means is embedded within said cement core for bracing said tube.

12. A carpet shearing device comprising a bed knife and a conveyor means conveying a carpet past said knife for shearing, a support comprising a fixed tube supported at both ends, internal bracing members disposed within said tube and a cement core in said tube disposed around said bracing members for forming a vibration resisting supporting structure, and a rotor having a plurality of dynamically balanced sections carrying blades mounted to rotate about said tube.

13. A carpet shearing device comprising a bed knife and a conveyor means conveying a carpet past said knife for shearing, a support comprising a fixed tube supported at both ends, internal bracing members disposed within said tube and a cement core in said tube disposed around said bracing members for forming a vibration resisting supporting structure, and a rotor carrying blades mounted to rotate about said tube, said rotor comprising a plurality of cylindrical individually balanced sections, said blades extending the entire length of the rotor and securing said sections together.

14. A carpet shearing device comprising a bed knife and a conveyor means conveying a carpet past said knife for shearing, a rotor support comprising a fixed tube supported at both ends, internal bracing members disposed within said tube and a cement core in said tube disposed around said bracing members for forming vibration resisting supporting structure, and dynamically balanced carrying blades mounted to rotate about said tube, a hood enclosing said rotor and an adjustable support carrying said hood and said bed knife for adjusting said knife with respect to said rotor.

No references cited.